(12) United States Patent
Park et al.

(10) Patent No.: US 6,744,738 B1
(45) Date of Patent: Jun. 1, 2004

(54) WIRELESS COMMUNICATION SYSTEM FOR VIDEO PACKET TRANSMISSION

(75) Inventors: Jong-hoon Park, Seoul (KR); Dong-seek Park, Taegu (KR); Yung-lyul Lee, Seoul (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 585 days.

(21) Appl. No.: 09/592,577

(22) Filed: Jun. 12, 2000

(30) Foreign Application Priority Data

Jun. 12, 1999 (KR) .......................... 1999-21910

(51) Int. Cl.[7] ............................... H04B 1/66
(52) U.S. Cl. .................. 370/252; 370/349; 370/474
(58) Field of Search ................ 370/349, 252, 370/474, 475, 476, 477, 485, 486; 348/384.1

(56) References Cited

U.S. PATENT DOCUMENTS

| | | | |
|---|---|---|---|
| 5,686,961 A | | 11/1997 | Gasztonyi et al. |
| 5,768,533 A | * | 6/1998 | Ran ........................ 709/247 |
| 5,805,762 A | | 9/1998 | Boyce et al. |
| 6,091,777 A | * | 7/2000 | Guetz et al. ............ 375/240.11 |
| 6,262,770 B1 | * | 7/2001 | Boyce et al. ............ 348/402.1 |

FOREIGN PATENT DOCUMENTS

| | | |
|---|---|---|
| EP | 0 782 364 A2 | 7/1997 |
| EP | 0 853 407 A2 | 7/1998 |
| JP | 06-284378 | 7/1994 |
| JP | 08-214261 | 8/1996 |

OTHER PUBLICATIONS

Hamid Gharavi et al., "Partitioning of MPEG Coded Video Bitstream for Wireless Transmission", vol. 4, No. 6, Jun. 1, 1997, pp. 153–155, XP000655961.

Paramvir Bahl et al., "H.263 based video codec for real–time visual communications over wireless radio networks", 1997 IEEE, Oct. 12, 1997, vol. 2, pp. 773–779, XP010248812.

J. Benois–Pineau, et al., "Video coding for wireless varying bit–rate communications based on area of interest and region representation", Oct. 26, 1997, pp. 555–558, XP010253813.

Madhukar Budagavi, et al., "Wireless Video Communications", 1999, pp. 3101–3118, XP000900847.

* cited by examiner

*Primary Examiner*—Min Jung
(74) *Attorney, Agent, or Firm*—Sughrue Mion, PLLC

(57) ABSTRACT

A wireless communication system for video packet transmission is provided. The wireless transmission system includes a video encoder for encoding a video signal on a block-by-block basis, and a degree of importance determiner for determining the degree of importance of video data encoded in each block from predetermined parameters. The wireless transmission system also includes a data transmission determiner for determining the transmission priority, or whether to transmit the encoded video data, on the basis of at least the amount of encoded video data to be transmitted per unit time the wireless channel conditions, and the degree of importance of the encoded video data. Furthermore, the wireless transmission system includes a video data packetizing unit for packetizing the video data determined to be transmitted, and a wireless transmitter for wirelessly transmitting packetized data. It is possible to transmit the video data with the amount of the data controlled for the fixed bandwidth of the wireless channel by determining the transmission priority or whether to transmit the video data, by considering the degree of importance of the currently encoded video is data. Therefore, when the bandwidth of the allowed channel is small and the amount of data to be transmitted per unit time is large, it is possible to transmit the video data faster since the video data is not buffered unlike in the conventional technology.

4 Claims, 2 Drawing Sheets

WIRELESS COMMUNICATION SYSTEM FOR VIDEO PACKET TRANSMISSION

BACKGROUND OF THE INVENTION

1. Field of the Invention

The present invention relates to a wireless communication system for video packet transmission, and more particularly, to a wireless communication system for determining whether to transmit a video packet considering the degree of importance of video data.

2. Description of the Related Art

In general, in wireless communication systems, moving picture information for video packet transmission is encoded through a video codec and encoded data is transmitted through a wireless channel with information items such as a header added thereto, after passing through the respective layers of the wireless communication system.

FIG. 1 is a block diagram of a conventional wireless transmission system for video packet transmission. The wireless transmission system shown in FIG. 1 includes a video encoder 100, a packetizing unit 102, and a wireless transmitter 104. The video encoder 100 encodes a moving picture to be transmitted. The packetizing unit 102 divides the encoded data in the form of packets and adds information items such as the header to each packet. The wireless transmitter 104 synchronously transmits video packet data through the wireless channel. In this case, the video encoder 100 must generate video data at a coding rate which is smaller than an allowed channel bandwidth. This is because information items such as header are added to the data transmitted through the channel in the lower layers of the wireless communication system, that is, the packetizing unit 102 and the wireless transmitter 104. Therefore, the video encoder 100 generates video data which is suitable for the allowed channel bandwidth.

However, when the video data are required to be transmitted at a transmission rate which is larger than the bandwidth of the channel, namely, when a large amount of video data is required to be transmitted, a certain amount of data is buffered and transmitted in order for the bandwidth of the channel to handle the amount of data. In this way, the buffered data is delayed.

In order to solve the above problem, a method in which more channel bandwidths are given should be provided. However, this method needs more transmission expenses since the amount of use of the channel increases.

SUMMARY OF THE INVENTION

To solve the above problem, it is an object of the present invention to provide a wireless transmission system for video packet transmission capable of determining the degree of importance of encoded video data and determining the transmission priority or whether to transmit corresponding video data according to the degree of importance, when the amount of the video data to be transmitted per unit time exceeds the bandwidth of a transmission channel.

It is another object of the present invention to provide a wireless receiving system for receiving video packet data which includes the degree of importance of the video packet data and for decoding the video packet data.

Accordingly, to achieve the first object, in one embodiment, there is provided a wireless, transmission system for transmitting a video packet through a wireless channel, the wireless transmission system comprising a video encoder for encoding a video signal on a block-by-block basis, a degree of importance determiner for determining the degree of importance of video data encoded in each block from predetermined parameters, a data transmission determiner for determining the transmission priority or whether to transmit the encoded video data on the basis of at least the amount of encoded video data to be transmitted per unit time, the wireless channel conditions, and the degree of importance of the encoded video data, a video data packetizing unit for packetizing the video data determined to be transmitted, and a wireless transmitter for wirelessly transmitting packetized data.

In another embodiment, there is provided a wireless transmission system for. transmitting a video packet through a wireless channel, the wireless transmisson system comprising a video encoder for encoding a video signal on a block-by-block basis, a degree of importance determiner for determining the degree of importance of video data encoded in each block from predetermined parameters, a data transmission determiner for determining the transmission priority or whether to transmit the encoded video data on the basis of at least the amount of encoded video data to be transmitted per unit time, the wireless channel conditions, and the degree of importance of the encoded video data, a video and degree of importance data packetizing unit for packetizing the video data determined to be transmitted and inserting an information field which shows the degree of importance of the video data into a packet, and a wireless transmitter for wirelessly transmitting packetized data.

To achieve the second object, there is provided a wireless receiving system for receiving video packet data including an information field, in the packet data and recovering the received video packet data, wherein the information field shows the degree of importance of packet data, the wireless receiving system comprising a wireless receiver for receiving the packet data, a packet assembling unit for separating from the packet data the information field, which shows the degree of importance of the video data, extracting encoded video data, and assembling the extracted video data, and a weight video decoder for determining the complexity of a recovery method according to the degree of importance of the video data and recovering the assembled video data by the recovery method having the determined complexity.

BRIEF DESCRIPTION OF THE DRAWINGS

The above objects and advantages of the present invention will become more apparent by describing in detail a preferred embodiment thereof with reference to the attached drawings in which.

DESCRIPTION OF THE PREFERRED EMBODIMENTS

Figure 1:
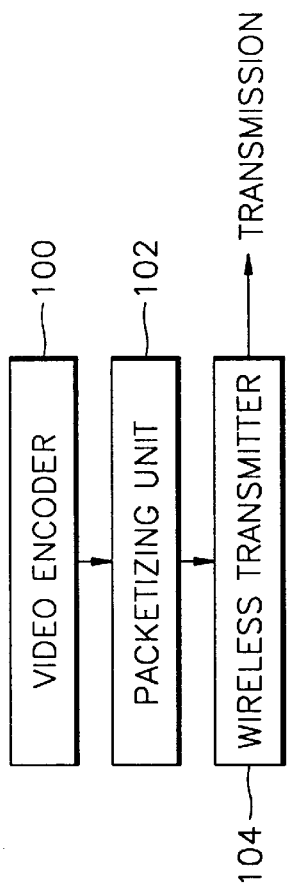
FIG. 1 is a block diagram of a conventional wireless transmission system for video packet transmission.
Figure 2:
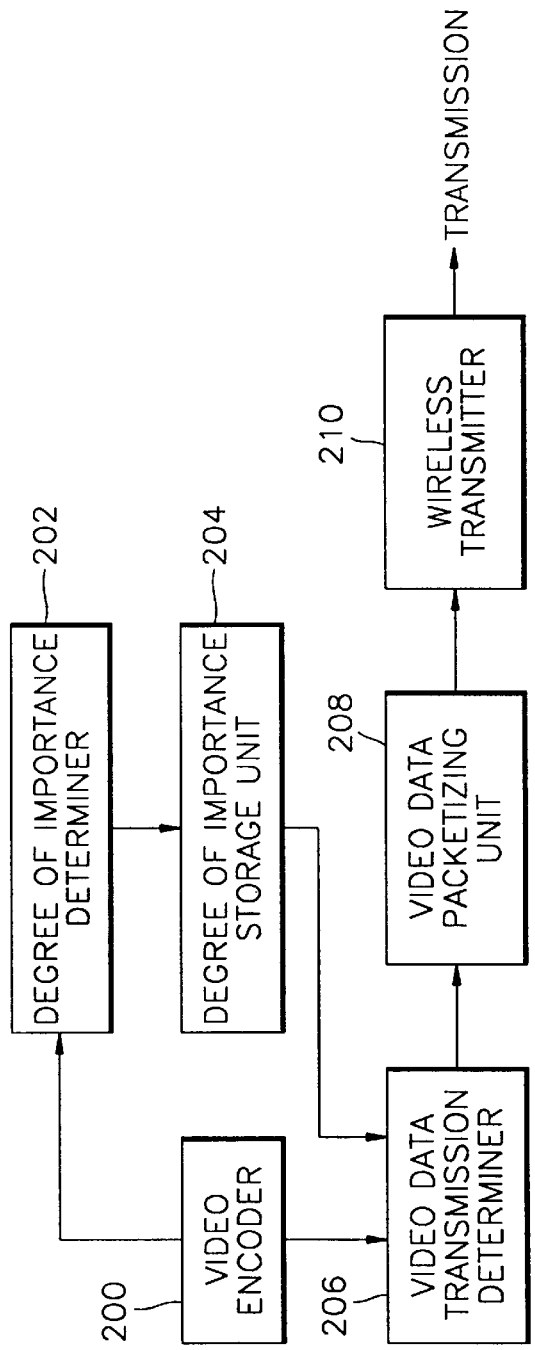
FIG. 2 is a block diagram of a wireless transmission system for video packet data according to the present invention.

Hereinafter, embodiments of the present invention will be described in more detail with reference to the attached drawings. FIG. 2 is a block diagram of a wireless transmission system for transmitting video packet data according to the present invention. The wireless transmission system of FIG. 2 includes a video encoder 200, a degree of importance determiner 202, a degree of importance storage unit 204, a video data transmission determiner 206, a video data packetizing unit 208, and a wireless transmitter 210.

The video encoder 200 encodes a moving picture to be transmitted. The encoding can be performed in units of a 16×16-pixel macro block. The degree of importance determiner 202 determines the degree of importance of the encoded data. Parameters for determining the degree of importance are whether video data is intra encoded or inter encoded, the motion vector value of the encoded video data, or whether the encoded video data falls on edge values. The degree of importance determiner 202 can determine the degree of importance of the encoded data by putting weight values on the above-mentioned parameters. The degree of importance storage unit 204 stores the degree of importance of encoded block units. The video data transmission determiner 206 determines the transmission priority or whether to transmit the encoded video data according to the degree of importance stored in the degree of importance storage unit 204, considering the channel conditions such as the bandwidth of the wireless channel and the error probability of the channel. For example, if the amount of the video data to be transmitted per unit time exceeds the bandwidth of a wireless channel and the degree of importance of the current video data block is low, it is determined not to transmit the video data block or to lower the transmission priority. As another example, when the bandwidth of the channel available to a user is small, however, the user wishes video data of good quality to be transmitted, the video data transmission determiner 206 determines to transmit the data whose degree of importance is high and not to transmit or to transmit later the data whose degree of importance is low. The video data packetizing unit 208 divides the video data determined to be transmitted by the video data transmission determiner 206 into packets and adds information items such as a header to each packet. The wireless transmitter 210 transmits video packets through the wireless channel. The transmitted video packets are received by a receiver (not shown), processed in a reverse order with respect to the order in which they are transmitted, decoded, and recovered.

Figure 3A:
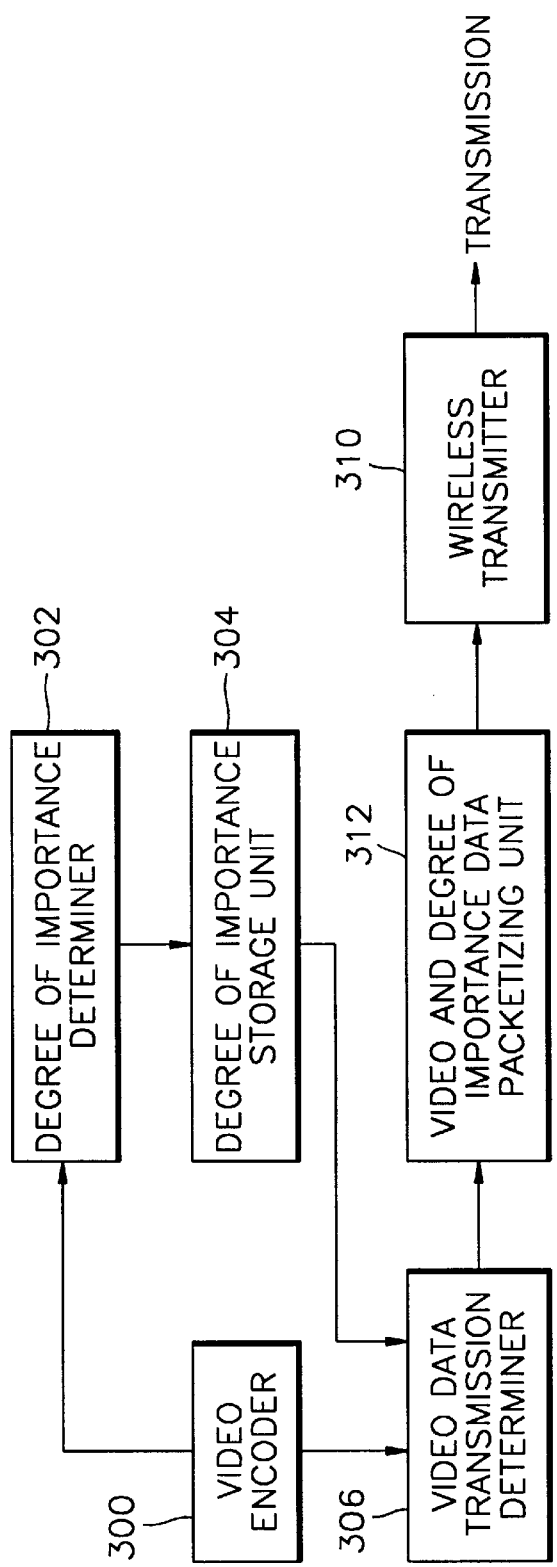
FIG. 3A is a block diagram of another embodiment of the wireless transmission system for the video packet data according to the present invention.

FIG. 3A is a block diagram of another embodiment of a wireless transmission system for video packet data according to the present invention. The wireless transmission system shown in FIG. 3A includes a video encoder 300, a degree of importance determiner 302, a degree of importance storage unit 304, a video data transmission determiner 306, a video and degree of importance data packetizing unit 312, and a wireless transmitter 310.

Here, the operations of the video encoder 300, the degree of importance determiner 302, the degree of importance storage unit 304, and the video data transmission determiner 306 are the same as the operations of the corresponding elements shown in FIG. 2.

The video and degree of importance data packetizing unit 312 divides the data determined to be transmitted by the video data transmission determiner 306 into packets, adds information items such as the header to each packet, and inserts data on the degree of importance of the corresponding data block stored in the degree of importance storage unit 304 into the packet as one of the information items. The wireless transmission unit 310 transmits the video packet into which the degree of importance data has been inserted.

Figure 3B:
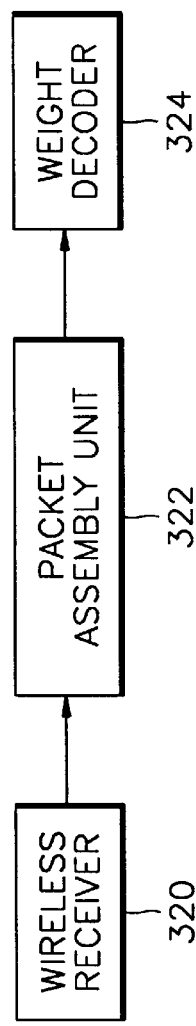
FIG. 3B shows a receiving system for receiving video packet data transmitted from the wireless transmission system shown in FIG. 3A and decoding the received video packets.

FIG. 3B shows a receiving system for receiving the video packet transmitted from the wireless transmission system shown in FIG. 3A and decoding the received video packet.

The wireless receiving system shown in FIG. 3B includes a wireless receiver 320, a packet assembly unit 322, and a weight decoder 324.

The wireless receiver 320 receives the video packet. The packet assembly unit 322 extracts the video data from the received video packet, separates the inserted degree of importance data from the video data, and assembles the extracted video data. The weight decoder 324 decodes the video data by a decoding method, wherein; the complexity of the decoding method corresponds to the degree of importance of the corresponding video data. For example, when the received video data block has errors and the degree of importance of the received video data block is low, the block in which errors are generated is decoded and recovered by a well-known error concealment method. Since the degree of importance of the video data block is low, the video data block is decoded and recovered from the information items of blocks adjacent to the block in which errors are generated. When the degree of importance of the video data block is high, it is possible to conceal the errors using a method which has a better video data recovery performance.

According to the present invention, it is possible to transmit video data, the amount of which is controlled for the fixed bandwidth of the wireless channel by determining the transmission priority or whether to transmit the video data by considering the degree of importance of the currently encoded video data. At this time, it; is possible to select the complexity of the error concealment method to be adopted according to the degree of importance of the video data when the video data in which the errors are generated are recovered in the receiving system. This is accomplished in part by transmitting data on the degree of importance of the video data together with the video data. Therefore, when the bandwidth of the allowed channel is small and the amount of data to be transmitted per unit time is large, it is possible to transmit the video data faster than the conventional technology, since the video data is not buffered.

What is claimed is:

1. A wireless transmission system for transmitting a video packet through a wireless channel, comprising:

a video encoder operable to encode a video signal on a block-by-block basis;

a degree of importance determiner operable to determine the degree of importance of video data encoded in each block based on predetermined parameters;

a data transmission determiner operable to determine a transmission priority based on the degree of importance and on at least one of an amount of encoded video data to be transmitted per unit time and wireless channel conditions, or operable to determine whether to prevent transmission of the encoded video data based on the degree of importance of the encoded video data and on at least one of the amount of encoded video data to be transmitted per unit time and the wireless channel conditions;

a video data packetizing unit operable to packetize the video data determined to be transmitted; and a wireless transmitter operable to wirelessly transmit packetized video data.

2. The wireless transmission system of claim 1, wherein the degree of importance determiner determines the degree of importance of the video data by putting weight values on the predetermined parameters, which include whether the video data is intra encoded or inter encoded, a motion vector value of the encoded video data, or whether the encoded video data falls on edge values.

3. A wireless transmission system for transmitting a video packet through a wireless channel, comprising:

a video encoder operable to encode a video signal on a block-by-block basis;

a degree of importance determiner operable to determine the degree of importance of video data encoded in each block based on predetermined parameters;

a data transmission determiner operable to determine a transmission priority based on the degree of importance and on at least one of an amount of encoded video data to be transmitted per unit time and wireless channel conditions, or operable to determine whether to prevent transmission of the encoded video data based on the degree of importance of the encoded video data and on at least one of the amount of encoded video data to be transmitted per unit time and the wireless channel conditions;

a video and degree of importance data packetizing unit operable to packetize the video data determined to be transmitted and operable to insert an information field which shows the degree of importance of the video data into a packet; and a wireless transmitter operable to wirelessly transmit packetized video data.

4. The wireless transmission system of claim 3, further comprising:

a wireless receiver operable to receive the packetized video data;

a packet assembly unit operable to separate from the packetized video data the information field, to extract the encoded video data, and to assemble the extracted video data; and a weight video decoder operable to determine a complexity of a recovery method according to the degree of importance of the video data and operable to recover the assembled video data by the recovery method having the determined complexity.

* * * * *

UNITED STATES PATENT AND TRADEMARK OFFICE
CERTIFICATE OF CORRECTION

PATENT NO. : 6,744,738 B1
DATED : June 1, 2004
INVENTOR(S) : Park et al.

It is certified that error appears in the above-identified patent and that said Letters Patent is hereby corrected as shown below:

Title page,
Item [*] Notice, delete the phrase "by 585 days" and insert -- by 664 days --

Signed and Sealed this

Eleventh Day of January, 2005

JON W. DUDAS
*Director of the United States Patent and Trademark Office*